2,894,933

VINYL AROMATIC POLYMERS STABILIZED WITH UREIDES

William K. Schweitzer, Jr., Midland, Mich., assignor to The Dow Chemical Company, Midland, Mich., a corporation of Delaware No Drawing. Application July 2, 1956
Serial No. 595,067

7 Claims. (Cl. 260—45.9)

This invention concerns compositions of matter consisting essentially of vinyl aromatic polymers and certain ureides as stabilizing agents for inhibiting the polymer against the embrittling and discoloring effects of light, heat or out-of-doors weathering.

Polystyrene is known to undergo undesirable physical changes upon prolonged exposure to light, heat, or out-of-doors weathering. The observable symptoms of such changes are discoloration or embrittlement, or both, due in varying measure to the action of light or heat and air or oxygen, and is dependent in part upon the oxygen content of the atmosphere in which it is exposed, the temperature and the presence or absence of sunlight. These characteristics are shared to more or less extent by other polymerized monovinyl aromatic hydrocarbons of the benzene series such as vinyltoluene, vinylxylene, ethylvinylbenzene, isopropylstyrene, ethylvinyltoluene, tert.-butylstyrene or diethylvinylbenzene, or copolymers of such monovinyl aromatic hydrocarbons and styrene.

Since the uses of vinyl aromatic polymers include the manufacture of molded articles and thin films, either embrittlement or discoloration of the polymer is to be avoided. The provision of stabilized vinyl aromatic polymers, i. e. thermoplastic resins consisting of one or more polymerized monovinyl aromatic hydrocarbons of the benzene series, is the principal object of the invention.

According to the invention, the foregoing object is attained by mixing, preferably intimately incorporating, with a vinyl aromatic polymer from 0.5 to 5 percent of a urea derivative selected from the group consisting of biuret and urea derivatives having the general formula:

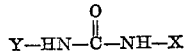

wherein X is a member of the group consisting of hydrogen, alkyl radicals containing from 1 to 4 carbon atoms, alkenyl radicals containing from 3 to 4 carbon atoms, acetyl and the phenyl radical, and Y is a member of the group consisting of the phenyl and alkyl radicals containing from 1 to 4 carbon atoms.

Examples of suitable urea derivatives are biuret, methyl urea, ethyl urea, propyl urea, tert.-butyl urea, allyl urea, methallyl urea, phenyl urea, dimethyl urea, diethyl urea, diphenyl urea, 1-acetyl-3-methyl urea, etc.

Articles made from vinyl aromatic polymers having one or more of such urea derivatives intimately incorporated throughout the polymer in amounts corresponding to from 0.5 to 5 percent, based on the weight of the polymer, show little or no tendency to discolor upon prolonged exposure to light and exhibit little tendency to become brittle as a result of such exposure.

The stabilizing agent can be incorporated with the vinyl aromatic polymer in any of several ways. The polymer can be heat-plastified on compounding rolls, in a Banbury mixer or in a plastics extruder and the agent added thereto in the desired amount and the mixture intimately blended into a uniform composition. The vinyl aromatic polymer and the stabilizing agent may be dissolved in a common solvent and the latter evaporated to recover the polymer containing the stabilizing agent.

In practice, the vinyl aromatic polymer, suitably in granular form and in admixture with the urea derivative in the desired amount, is heat-plastified on compounding rolls, in a Banbury mixer or in a plastics extruder and the mixture intimately blended into a uniform composition. Thereafter, the material is cooled and cut or ground to a granular form suitable for molding.

Small amounts of additives such as dyes, colors, pigments, plasticizers, flow agents, lubricants, etc. can also be incorporated with the polymers, but such additives are not required. When used, the additives are usually employed in amounts corresponding to from 0.1 to 10 percent by weight of the polymer.

The following examples illustrate ways in which the principle of the invention has been applied, but are not to be construed as limiting its scope.

EXAMPLE 1

In each of a series of experiments, a charge of 298.5 grams of molding grade polystyrene was heat-plastified by milling the same on a pair of laboratory compounding rolls one of which was heated at a temperature of 340° F. and the other at a temperature of 230° F. Thereafter, the heat-plastified polystyrene was compounded with 1.5 grams of a urea derivative stabilizing agent as identified in the following table for a period of about 6 minutes. The composition was removed from the rolls, allowed to cool and ground to a granular form. The composition was injection molded to form test pieces having the dimensions 2 x 2½ inches by 0.1 inch thick. These test pieces were used to determine the effect of the urea derivative for inhibiting discoloration of the polystyrene upon exposure to out-of-doors weathering. The procedure for determining the stabilizing action of the added agent was to measure the percent of light having wave lengths between 420 and 620 millimicrons through a molded test piece of the composition as initially prepared. The difference between the percent of light transmitted at wave lengths of 420 and 620 millimicrons represents a measure of the color of the composition. The test pieces were then exposed to weathering in the State of Florida, U.S.A. at about latitude 25° North on a rack facing South with the test pieces inclined at an angle of 45 degrees above horizontal for a period of three months. After exposure of the test pieces of the composition to out-of-doors weathering for the test period, they were removed and again tested for color, employing procedure as previously described. The difference between the color of the composition as initially prepared and its color after exposure to out-of-doors weathering represents a measure of the coloring or yellowing of the polymer due to the weathering. The table identifies the compositions by naming the ingredients employed in preparing the same. The table also gives the color of the compositions as initially prepared, its color after out-of-doors weathering and the coloring or yellowing of the composition. For purpose of comparison, test pieces of the polystyrene without a stabilizing agent were prepared and tested under similar conditions.

Table

| Run No. | Starting Materials | | Poly-styrene, Percent | Product | | |
|---|---|---|---|---|---|---|
| | Stabilizing Agent | | | Initial Color | Final Color | Yellowing |
| | Kind | Percent | | | | |
| 1 | None | 0.0 | 100 | 2.3 | 23.4 | 21.1 |
| 2 | 1,3-Dimethyl urea | 0.5 | 99.5 | 5.6 | 21.2 | 15.6 |
| 3 | 1,3-Diethyl urea | 0.5 | 99.5 | 7.6 | 22.4 | 14.8 |
| 4 | 1,3-Diphenyl urea | 0.5 | 99.5 | 2.8 | 20.3 | 17.5 |
| 5 | Tert.-butyl urea | 0.5 | 99.5 | 7.9 | 16.8 | 8.9 |
| 6 | Phenyl urea | 0.5 | 99.5 | 5.4 | 22.2 | 16.8 |
| 7 | Allyl urea | 0.5 | 99.5 | 21.7 | 25.4 | 3.7 |
| 8 | Biuret | 0.5 | 99.5 | 19.7 | 22.1 | 2.4 |
| 9 | 1-Acetyl-3-methyl urea | 0.5 | 99.5 | 4.5 | 14.6 | 10.1 |

I claim:

1. A composition of matter consisting essentially of a polymeric body consisting of a polymerized monovinyl aromatic hydrocarbon of the benzene series and as a stabilizing agent for inhibiting discoloration and embrittlement, from 0.5 to 5 percent, based on the weight of the polymer, of a urea derivative selected from the group consisting of biuret and urea derivative having the general formula:

$$Y-HN-\overset{O}{\underset{\|}{C}}-NH-X$$

wherein X represents a member of the group consisting of hydrogen, alkyl radicals containing from 1 to 4 carbon atoms, alkenyl radicals containing from 3 to 4 carbon atoms, acetyl and the phenyl radical, and Y is a member of the group consisting of the phenyl and alkyl radicals containing from 1 to 4 carbon atoms.

2. A composition as claimed in claim 1, wherein the ureide is 1,3-dimethylurea.

3. A composition as claimed in claim 1, wherein the ureide is 1,3-diethylurea.

4. A composition as claimed in claim 1, wherein the ureide is 1,3-diphenylurea.

5. A composition as claimed in claim 1, wherein the ureide is tert.-butylurea.

6. A composition as claimed in claim 1, wherein the ureide is 1-acetyl-3-methylurea.

7. A composition of matter consisting essentially of polystyrene and as a stabilizing agent for inhibiting discoloration and embrittlement from 0.5 to 5 percent, based on the weight of the polystyrene, of a urea derivative selected from the group consisting of biuret and urea derivatives having the general formula:

$$Y-HN-\overset{O}{\underset{\|}{C}}-NH-X$$

wherein X is a member of the group consisting of hydrogen, alkyl radicals containing from 1 to 4 carbons, alkenyl radicals containing from 3 to 4 carbon atoms, acetyl and the phenyl radical, and Y is a member of the group consisting of the phenyl and alkyl radicals containing from 1 to 4 carbon atoms.

References Cited in the file of this patent

UNITED STATES PATENTS

| 2,555,167 | Van Dijk et al. | May 29, 1951 |
| 2,557,474 | Sanderson | June 19, 1951 |
| 2,583,370 | Goppel et al. | Jan. 22, 1952 |
| 2,588,899 | Voorthuis et al. | Mar. 11, 1952 |

OTHER REFERENCES

Naming and Indexing of Chemical Compounds by Chemical Abstracts, Dec. 20, 1945, page 5948, "ureides." (Copy in Div. 60.)